US008575856B2

(12) United States Patent  (10) Patent No.: US 8,575,856 B2
Chung et al.  (45) Date of Patent: Nov. 5, 2013

(54) DRIVER CIRCUIT FOR POWERING A DC LAMP IN A NON-DC LAMP FITTING

(75) Inventors: Shu Hung Henry Chung, Hong Kong (HK); Nan Chen, Hong Kong (HK)

(73) Assignee: City University of Hong Kong, Kowloon (HK)

( * ) Notice: Subject to any disclaimer, the term of this patent is extended or adjusted under 35 U.S.C. 154(b) by 268 days.

(21) Appl. No.: 13/150,435

(22) Filed: Jun. 1, 2011

(65) Prior Publication Data

US 2012/0306403 A1 Dec. 6, 2012

(51) Int. Cl.
*H05B 37/03* (2006.01)

(52) U.S. Cl.
USPC ............. 315/291; 315/86; 315/149; 315/139; 362/147; 362/218

(58) Field of Classification Search
USPC ........... 315/86, 149, 139, 186, 224, 291, 293, 315/297, 307; 362/147, 218, 235, 294, 373
See application file for complete search history.

(56) References Cited

U.S. PATENT DOCUMENTS

| 5,932,976 A * | 8/1999 | Maheshwari et al. ......... 315/291 |
| 7,084,584 B2 * | 8/2006 | Ben-Yaakov ................. 315/291 |
| 7,728,528 B2 * | 6/2010 | Chan et al. .................... 315/224 |
| 7,924,578 B2 * | 4/2011 | Jansen et al. ............... 363/21.02 |
| 2003/0210000 A1 * | 11/2003 | Erhardt .......................... 315/307 |
| 2007/0090767 A1 * | 4/2007 | Roberts ......................... 315/139 |
| 2011/0279033 A1 * | 11/2011 | Yang et al. ..................... 315/86 |
| 2012/0112648 A1 * | 5/2012 | Hariharan ..................... 315/186 |
| 2012/0274237 A1 * | 11/2012 | Chung et al. .................. 315/297 |

* cited by examiner

*Primary Examiner* — Vibol Tan

(57) ABSTRACT

A driver circuit for adapting an LED lamp or an LED lamp array to be used in a lamp fitting for a non-LED type lamp without modification of the lamp fitting. The LED lamp or LED lamp array can be inserted into the lamp fitting as a replacement for a non-LED lamp. The driver circuit has a first stage with a filter circuit and having an input connectable to any of an ac power supply, an electromagnetic ballast or an electronic ballast of the lamp fitting; a second stage with a high frequency switched network and having an input connected to an output of the first stage; and a third stage with an ac/dc converter and having an input connected to an output of the second stage and an output connectable to an LED lamp. The third stage is configured to deliver dc power to a connected LED lamp. The second stage is configured to operate in a low frequency mode and in a high frequency mode.

21 Claims, 15 Drawing Sheets

DRIVER CIRCUIT FOR POWERING A DC LAMP IN A NON-DC LAMP FITTING

FIELD OF THE INVENTION

The invention relates to a driver circuit for powering a dc lamp such as a Light Emitting Diode (LED) lamp in a non-dc powered lamp fitting and, more particularly, to a driver circuit for enabling an LED lamp or LED lamp array to be used in a lamp fitting designed for a non-LED type lamp.

BACKGROUND OF THE INVENTION

Fluorescent lamps have been widely used in many residential, commercial and industrial lighting applications as they offer high efficacy (lumen per Watt) and have proven operational stability. As they require a high ignition voltage to discharge the lamp and have negative resistance, a device called a ballast is used to generate the ignition voltage and regulate the lamp current.

Ballasts are of two major kinds: a low-frequency electromagnetic type and a high-frequency electronic type. Electromagnetic ballasts are made of passive components. They have the advantages of high reliability, long lifetime, and robustness against transient voltage surge and a hostile working environment. However, their energy efficiency, input power factor and power density are typically low. Electronic ballasts are now widely adopted as they have an overall economic benefit compared to other solutions. Moreover, they have good performance characteristics such as high input power factor, low input current harmonics, good lamp current crest factor, and low flickering. Operating the lamps at high frequency can also attain a higher efficacy than mains-frequency-operated electromagnetic ballasts.

With recent advancements in microelectronics technology, light-emitting-diode (LED) lighting is now becoming increasingly popular for general lighting and special purpose lighting applications. Compared with fluorescent lamps, LEDs have longer life expectancy and higher resistant to vibration failure. They also consume considerably less power. Moreover, they can operate on a low voltage. Thus, it would be advantageous if fluorescent lamps could be substituted by LED lamps in existing installed lamp fittings. This would enable the existing lamp infrastructure to be retained which is clearly desirable. However, even though the existing fluorescent lamp fixtures/fittings could be retained, the ballasts (electromagnetic or electronic) installed inside such lamp fixtures would have to be removed or replaced by LED drivers. This requires rewiring of the lighting circuits which is time consuming and expensive, particularly as it has to be performed in situ with the existing fittings and fixtures.

OBJECTS OF THE INVENTION

An object of the invention is to mitigate or obviate to some degree one or more problems associated with known lamp fittings designed for non-dc or non-LED type lamps.

The above object is met by the combination of features of the main claim; the sub-claims disclose further advantageous embodiments of the invention.

One skilled in the art will derive from the following description other objects of the invention. Therefore, the foregoing statement of object is not exhaustive and serves merely to illustrate some of the many objects of the present invention.

SUMMARY OF THE INVENTION

The invention provides a driver circuit for adapting a dc lamp such as an LED lamp or an LED lamp array to be used in a non-dc or non-LED type lamp fitting for a non-LED type lamp, e.g. a fluorescent lamp, without modification of the lamp fitting. The driver circuit is such that the LED lamp or LED lamp array can be inserted into the non-LED type lamp fitting as a replacement for a non-LED lamp such that the LED lamp and the driver circuit are retained in the lamp fitting and make electrical connections with the lamp fitting's electrical contacts for powering the inserted lamp. The driver circuit enables the LED lamp or lamp array to operate with any of an ac power supply, an electromagnetic ballast or an electronic ballast of the lamp fitting where these are present in the fitting as the means of powering a non-LED type lamp. The invention also relates to an LED lamp combined with a driver circuit according to the invention as a replacement lamp unit for a non-LED lamp in the lamp fitting and, in another arrangement, to a lamp fitting configured to power anon-LED lamp, but incorporating a driver circuit according to the invention to thereby adapt said lamp fitting to receive an LED lamp or LED lamp array instead of or in replacement of a lamp of the type for which the fitting was originally configured to power without requiring any further modification of the lamp fitting.

The driver circuit can be powered by different power sources such as an ac mains power supply, a low-frequency electromagnetic ballast, or a high-frequency electronic ballast. Its input impedance is controlled to meet the operational requirements and conditions of the different power sources and its output is controlled to deliver the required power to the LED lamp/array. When the driver circuit is powered by the ac mains or a low-frequency electromagnetic ballast, it is configured as an active power factor correction circuit. Its input current is controlled to follow the wave shape of the source voltage. When the driver circuit is powered by a high-frequency electronic ballast, it is configured as a phase-shifted resonant converter circuit with controllable input resistance and susceptance. The driver circuit having such universal compatibility with available ac power sources allows replacement of fluorescent lamps with the retrofit dc or LED lamps without removal or replacement of existing ballasts or modification of the lighting infrastructure.

In a first main aspect of the invention, there is provided a driver circuit comprising a first stage comprising a filter circuit and having an input connectable to any of an ac power supply, an electromagnetic ballast or an electronic ballast of a non-dc type lamp fitting such as anon-LED type lamp fitting, a second stage comprising a high frequency switched network and having an input connected to an output of the first stage, and a third stage comprising an ac/dc converter and having an input connected to an output of the second stage and an output connectable to a dc type lamp such as an LED lamp or LED lamp array. The third stage is configured to deliver dc power to a connected LED lamp/array. Preferably, the second stage is configured to operate in a low frequency mode when said driver circuit is connected to an ac power supply or an electromagnetic ballast of the lamp fitting and configured to operate in a high frequency mode when said driver circuit is connected to an electronic ballast of the lamp fitting.

One unexpected technical benefit of the driver circuit according to the invention is that, where the driver circuit is operating to power a dc lamp with an existing ballast in an existing non-dc lamp fitting and the ballast then fails, the driver circuit can enable the dc lamp to still operate directly with the lamp fitting's ac power supply rather than through the ballast thereby negating the need to repair or replace the ballast.

Preferably, the filter circuit of said first stage comprises a low pass filter.

Preferably, the third stage includes a transformer for isolating the dc output of said third stage from the ac input of said third stage.

Preferably also, the second stage is configured to operate as a power factor correction circuit when in its low frequency made of operation and the filter circuit operates as a low pass filter to reduce or eliminate high-frequency harmonics generated by the second stage operating as a power factor correction circuit. The second stage may be configured to operate as a bridgeless power factor correction circuit in discontinuous conduction mode when in its low frequency made of operation. The power factor correction circuit may be operated in its discontinuous conduction mode with a fixed switching frequency.

Preferably, switching transistors of said second stage are operated at a duty cycle between 0.23 and 0.5, but, more preferably, the switching transistors are operated at a duty cycle equal to 0.5 in either of the low frequency or high frequency modes of operation.

The second stage may be configured to operate as a phase-shift resonant converter circuit when in its high frequency made of operation.

Preferably, the second stage is controlled to operate in its low frequency mode or its high frequency mode dependent on a switched state of a bilateral triode thyristor (Triac), said Triac comprising part of said second stage.

Preferably also, the switching transistors of the second stage are shared with the third stage of the driver circuit.

The driver circuit may include a microprocessor controller which may he configured to detect an operating mode of the second stage and to derive a synchronization signal based on a detected operating mode. The microprocessor controller may also generate a gate signal for the switching transistors of the second stage based on said derived synchronization signal.

In a second main aspect of the invention, there is provided a LED lamp including a driver circuit according to the first main aspect, wherein said LED lamp can be electrically connected into a lamp fitting for a non-LED lamp type whereby said driver circuit enables said LED lamp to be powered by said lamp fitting without modification of the lamp fitting.

In a third main aspect of the invention, there is provided a lamp fitting configured to power a non-LED lamp, but incorporating a driver circuit according to the first main aspect and adapted to receive a LED lamp without modification of the lamp fitting whereby the driver circuit enables the LED lamp to be powered by the lamp fitting.

In a fourth main aspect of the invention, there is provided a method of powering a LED lamp in a lamp fitting designed for a non-LED lamp type, said method comprising: connecting a driver circuit according to the first main aspect between the LED lamp and the electrical connections of the lamp fitting.

Preferably, the method comprises connecting the driver circuit to the LED lamp to form a combined driver circuit and LED lamp unit such the combined driver circuit and LED lamp unit is insertable into the lamp fitting for a non-LED lamp type to be retained in said lamp fitting and make connection with electrical lamp contacts of said lamp fitting.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which:

FIG. 1b is an equivalent circuit diagram of the ballast-lamp system of FIG. 1a;

DESCRIPTION OF PREFERRED EMBODIMENTS

Figure 1A:
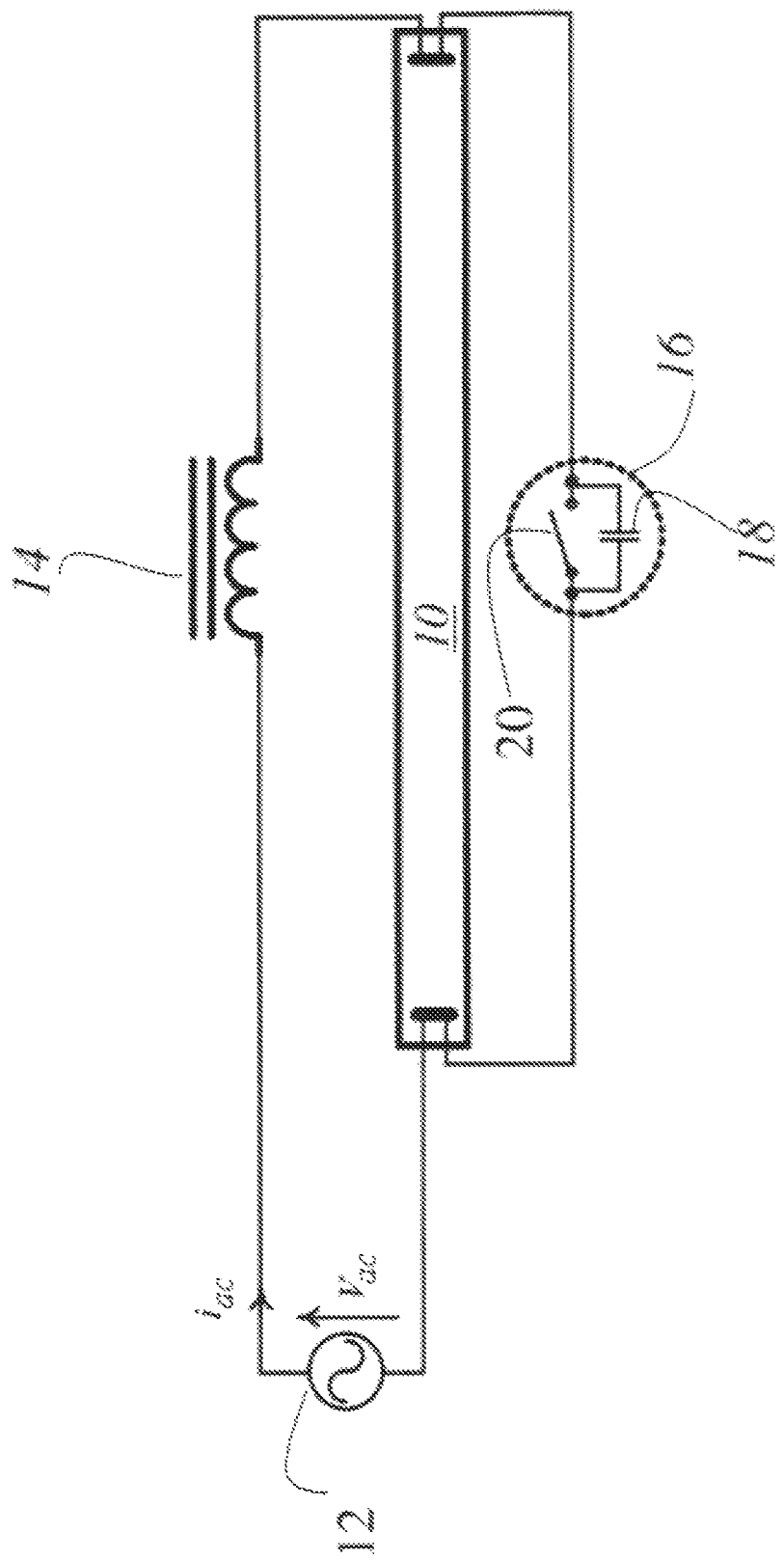
FIG. 1a is a schematic circuit diagram of a conventional ballast-lamp system with an electromagnetic ballast.

The following description is of a preferred embodiment by way of example only and without limitation to the combination of features necessary for carrying the invention into effect.

The present invention provides a driver circuit for a dc lamp that enables said dc lamp to work in existing lamp fittings for non-dc powered lamps without changing or modifying the existing lighting fixtures or infrastructure. The driver circuit adapts a dc lamp such as an LED lamp or an LED lamp array to be used in a non-dc or non-LED type lamp fitting without modification of the lamp fitting. The driver circuit is such that the LED lamp or LED lamp array can be inserted into the non-LED type lamp fitting as a replacement for anon-LED lamp such that the LED lamp and the driver circuit are retained in the lamp fitting and make electrical connections with the lamp fitting's electrical contacts for powering the inserted lamp. The driver circuit enables the LED lamp or lamp array to operate with any of an ac power supply, an electromagnetic ballast or an electronic ballast of the lamp fitting where these are already present in the fitting as the means of previously powering a non-LED type lamp, e.g. a fluorescent lamp.

Referring to the drawings, FIGS. 1 and 2 show the circuit structures and equivalent circuits of conventional ballast-lamp systems having an electromagnetic ballast and an electronic ballast, respectively.

Figure 1B:
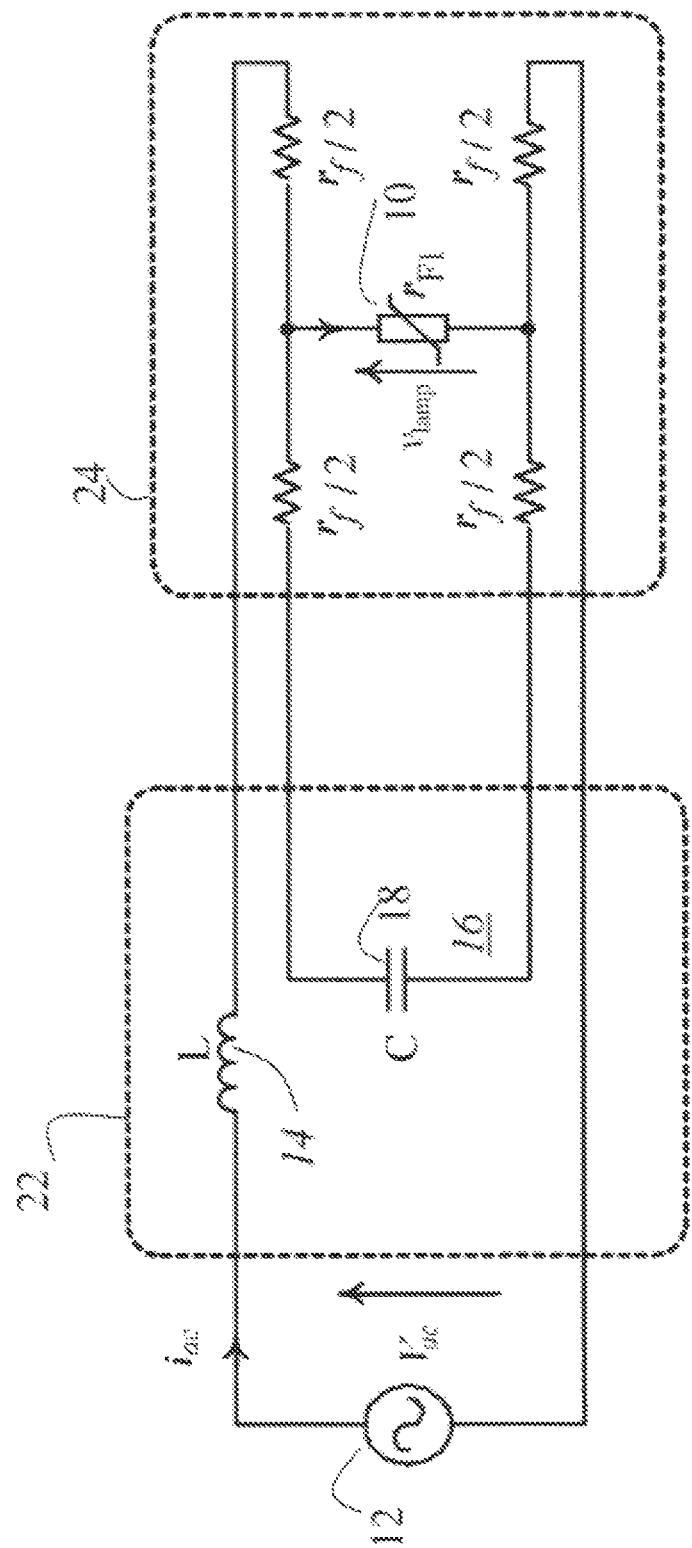

As shown in FIG. 1(a), the non-dc lamp, e.g. a fluorescent lamp 10, is connected to an ac power supply 12, an electromagnetic ballast 14 and a starter 16. The electromagnetic ballast comprises an inductor. When power is applied to the entire circuit, a closed circuit is formed. Current flows though the ballast, one lamp filament, the starter, and then through the other lamp filament. After the starter is heated up, the starter switch will open. The capacitor 18 across the starter switch 20 is used to reduce radio frequency interference and prolong the starting pulses. A high voltage will be generated across the lamp 10 to ignite it. The steady-state voltage across the lamp 10 is at the line frequency and the lamp current is stabilized by the ballast 14. FIG. 1(b) shows the equivalent circuit of the entire system of FIG. 1(a), in which the left-most dashed line box 22 comprises the equivalent circuit of the electromagnetic ballast 14 and the right-most dashed line box 24 comprises the equivalent circuit of the fluorescent lamp 10. The inductor L represents the inductance of the ballast 14 and the capacitor C represents the capacitor 18 across the starter 16. The lamp 10 is modeled by a nonlinear element $r_{Fl}$.

Figure 2A:
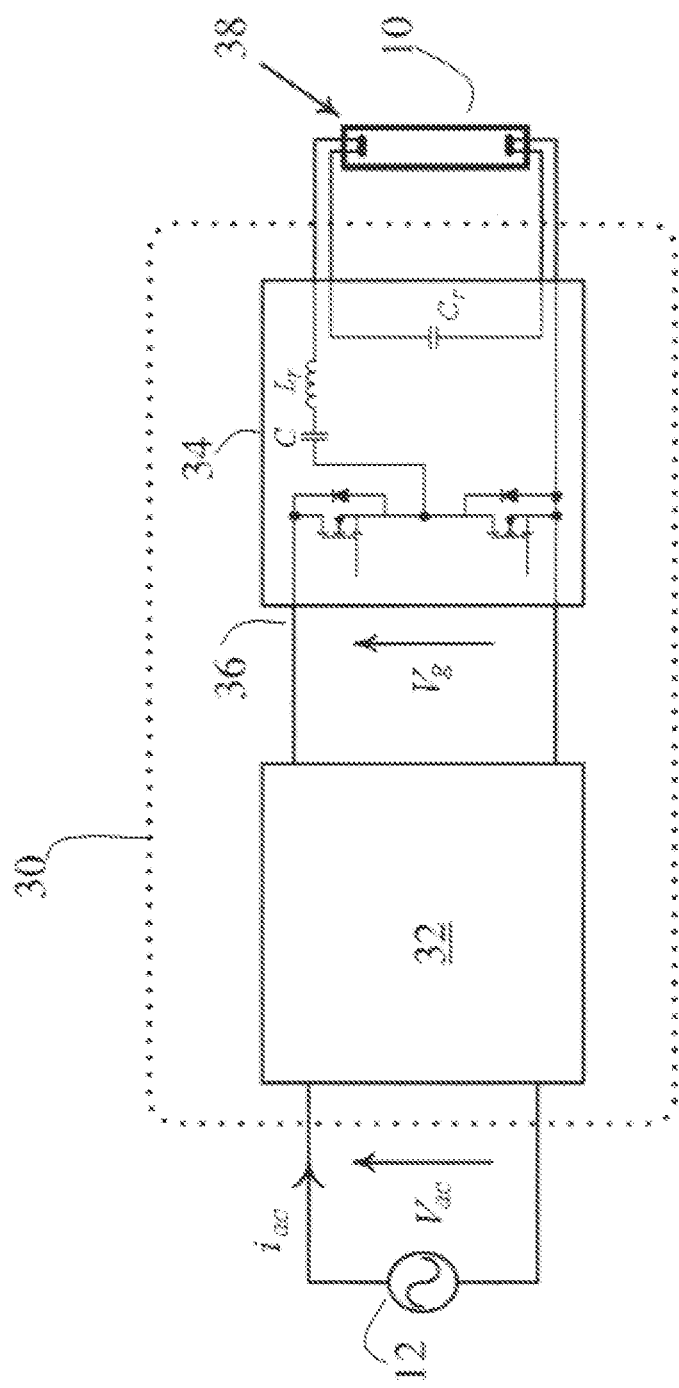
FIG. 2a is a schematic circuit diagram of a conventional ballast-lamp system with an electronic ballast
Figure 2B:
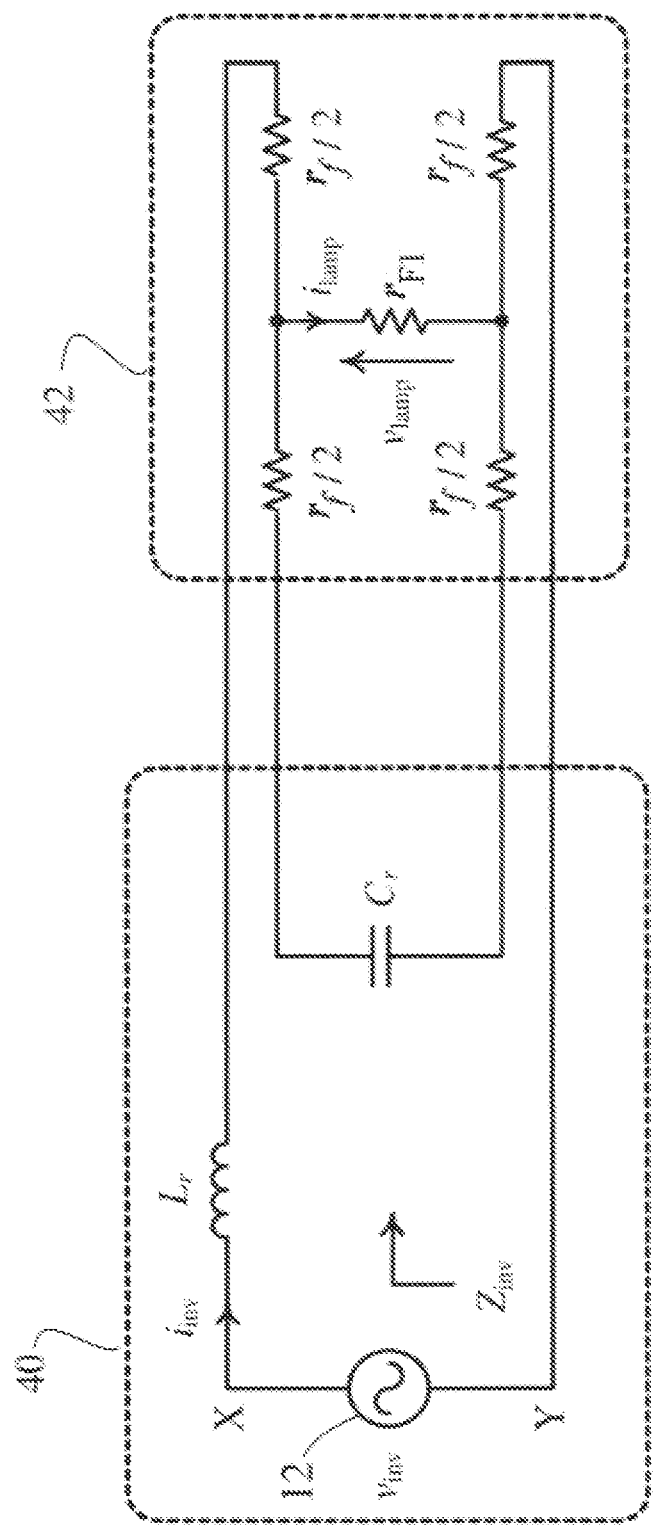
FIG. 2b is an equivalent circuit diagram of the ballast-lamp system of FIG. 2a without inverter current feedback.
Figure 2C:
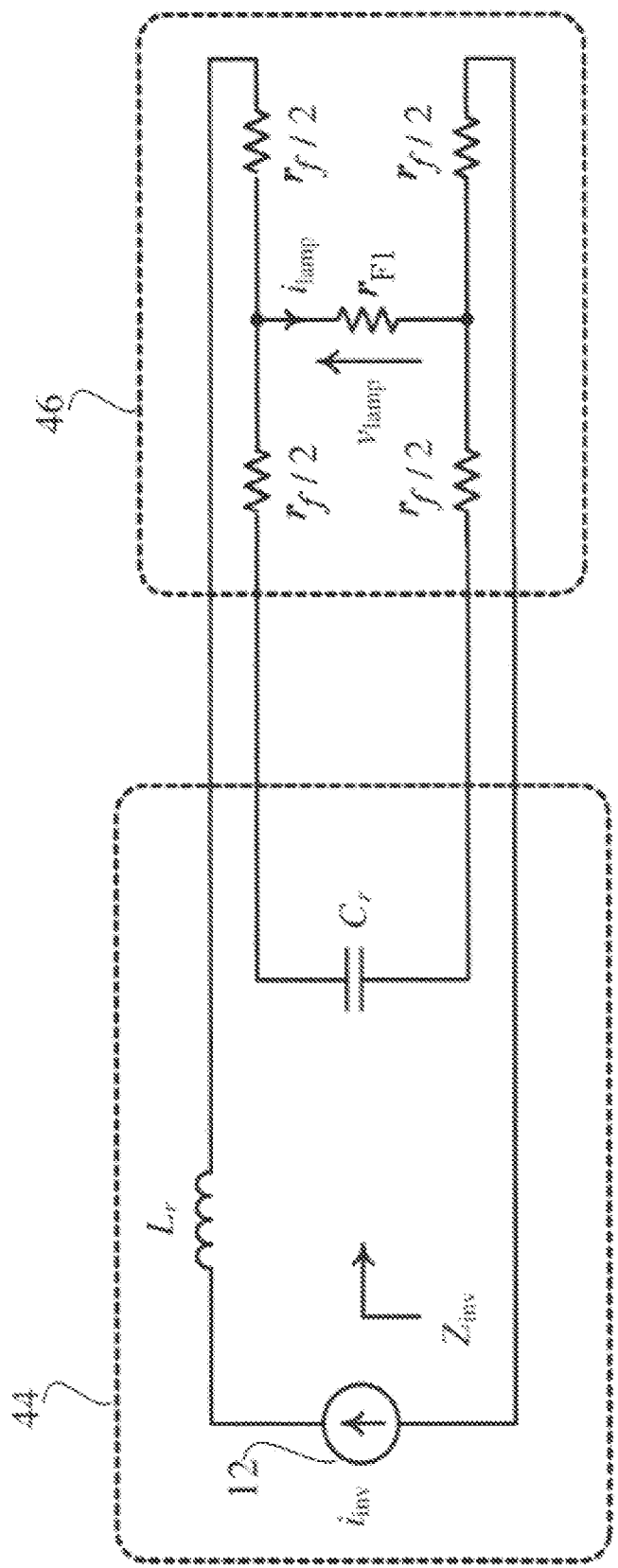
FIG. 2c is an equivalent circuit diagram of the ballast-lamp system of FIG. 2a with inverter current feedback.

As shown in FIG. 2(a), the non-dc lamp 10 is connected to an electronic ballast 30 which in turn is connected to an ac power supply 12. The electronic ballast 30 comprises a high frequency dc/ac resonant inverter circuit 32 adjacent the ballast's output and an active or passive power factor correction circuit 34 near the ballast's input. The power factor correction circuit 34 is connected to the inverter 32 by a dc link 36. A typical circuit for the inverter (resonant tank) 32 is a voltage-fed half-bridge series-resonant parallel-loaded inverter. The resonant tank 32 is used to preheat the lamp filaments 38, maintain the filament temperature, generate a sufficiently high voltage to ignite the lamp 10, facilitate soft-switching in the inverter 32, and give a near sinusoidal lamp current. FIG. 2(b) shows the equivalent circuit model of the ballast-lamp system of FIG. 2(a) in which the left-most dashed line box 40 comprises the equivalent circuit of the electronic ballast 30 without inverter current feedback and the right-most dashed line box 42 comprises the equivalent circuit of the high-frequency fluorescent lamp 10. A high-frequency ac voltage source 12 is used to drive the resonant circuit formed by $L_r$ and $C_r$. The fluorescent lamp 10 is modeled by a resistor $r_{Fl}$ in high-frequency operation. The filaments 38 are modeled by resistors $r_f$. Some electronic ballasts as shown by the equivalent circuit of FIG. 2(c) have an inverter current feedback. Thus, those ballasts are modeled as a high-frequency current source. In FIG. 2(c), the left-most dashed line box 44 comprises the equivalent circuit of the electronic ballast with inverter current feedback and the right-most dashed line box 46 comprises the equivalent circuit of the high-frequency fluorescent lamp 10.

Figure 3A:
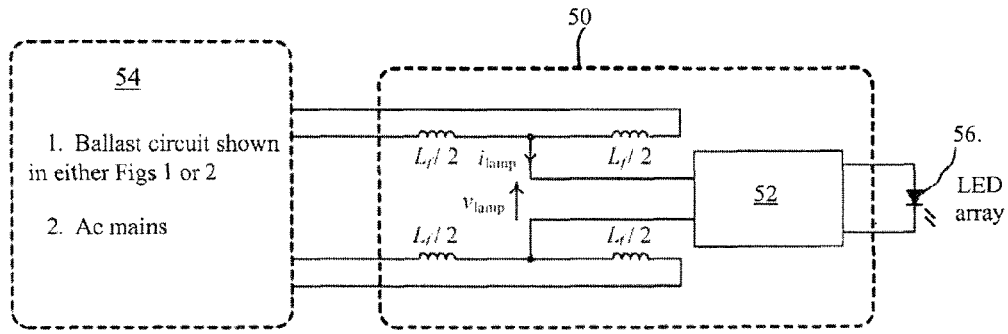
FIG. 3a is a schematic circuit diagram of an LED lamp system according to the invention.

To better understand the operating principles of the driver circuit according to the invention, reference is made to FIG. 3 of the drawings. FIG. 3(a) illustrates how a dc lamp system 50 including an LED lamp or LED lamp array 56 can be adapted to include a driver circuit 52 according to the invention to adapt it as a replacement for a fluorescent lamp in an existing fluorescent lamp fitting 54. For sake of convenience, a reference to an LED lamp should be considered as being a reference to an LED lamp array. In FIG. 3(a), the driver circuit 52, which is more fully illustrated in FIG. 4, is connected to the filaments of the lamp system 50 which are represented by two inductors $L_f$. The LED lamp system 50 and driver circuit 52 are connected with any of a conventional ballast as shown in FIG. 1 or FIG. 2 or an ac mains power supply of an existing non-LED lamp fitting 54. The value of $L_f$ is chosen to give similar impedance as the filament resistance $r_f$ in FIG. 2 at the operating frequency $f_{EB}$ of the electronic ballast. That is $$L_f = \frac{r_f}{2\pi f_{EB}} \qquad (1)$$

Figure 3B:
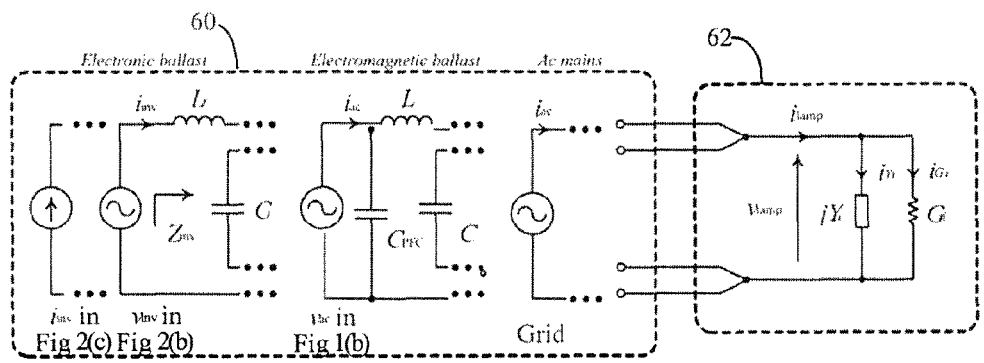
FIG. 3b is an equivalent circuit diagram of the LED lamp system of FIG. 3a showing alternate connections of a driver circuit to an electronic ballast, an electromagnetic ballast and an ac mains power supply.
Figure 4:
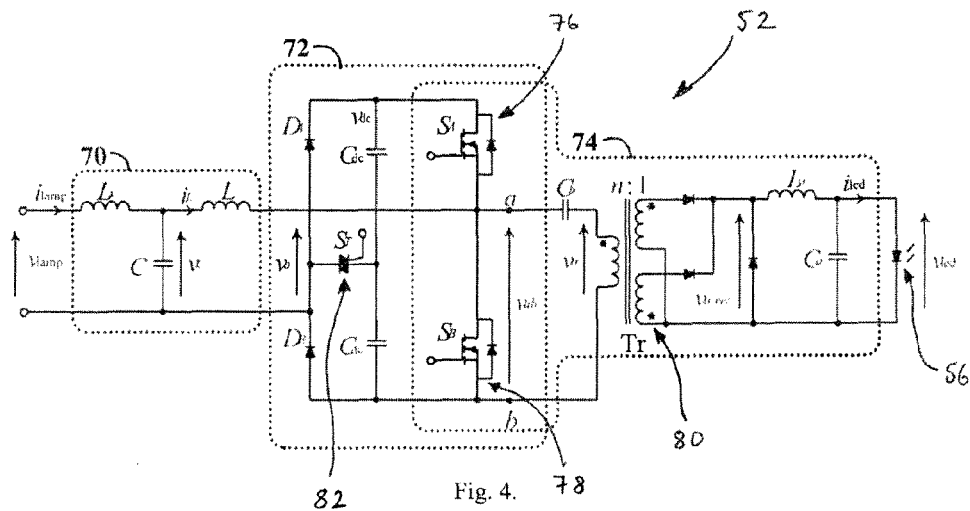
FIG. 4 is a schematic circuit diagram of a driver circuit according to the invention.

FIG. 3(b) is the equivalent circuit for the system illustrated by FIG. 3(a). In FIG. 3(b), the left-most dashed line box 60 comprises the equivalent circuit of the ballast (electromagnetic or electronic) or ac mains power supply of the existing lamp fitting 54 and the right-most dashed line box 62 comprises the equivalent circuit of the LED lamp driver circuit 52 of the invention. The lamp driver circuit 52 is designed to have input conductance $G_i$ and susceptance $Y_i$ as shown in FIG. 3(b). $G_i$ and $Y_i$ are used to model the active power and reactive power, respectively, transferred between the ballast and lamp. The output current of the ballast, which is also the input current of the driver $i_{lamp}$, is the total current through $G_i$ (i.e., $i_{Gi}$) and $Y_i$ (i.e., $i_{Yi}$).

FIG. 4 shows a circuit diagram of a preferred embodiment of the driver circuit 52 of the invention. This comprises a first stage 70 comprising a filter circuit and having an input connectable to any of an ac power supply, an electromagnetic ballast or an electronic ballast of a non-dc type lamp fitting such as a non-LED type lamp fitting, a second stage 72 comprising a high frequency switched network and having an input connected to an output of the first stage 70, and a third stage 74 comprising an ac/dc converter and having an input connected to an output of the second stage 72 and an output connectable to a dc type lamp such as an LED lamp or LED lamp array. The third stage 74 is configured to deliver dc power to a connected LED lamp/array 56. The second stage 72 is preferably configured to operate in a low frequency mode when said driver circuit 52 is connected to an ac power supply or an electromagnetic ballast of the conventional lamp fitting and configured to operate in a high frequency mode when said driver circuit 52 is connected to an electronic ballast of the lamp fitting. The filter network of the first stage 70 is formed by components $L_x$, C, and L. The input voltage and current of the driver circuit 52 are $v_{lamp}$ and $i_{lamp}$, respectively. The second and third stages 72, 74 may share the same transistor switches $S_A$ and $S_B$ 76, 78. The transformer Tr 80 is used to provide electrical isolation between the input and output of the third stage 74 and necessary voltage conversion from the primary side to the load in said stage 74.

When the driver 52 is connected to the ac mains or an electromagnetic ballast, it is in its low-frequency mode of operation. The Triac $S_T$ 82 is turned off. The switched network 72 and the inductor L are then configured as a power factor corrector circuit (PFC). $L_x$ and C form a low-pass filter that eliminates high-frequency harmonics generated by the PFC. The output $v_{ab}$ of the switched network 72 contains high-frequency voltage pulses. The series capacitor $C_b$ blocks the dc component of $v_{ab}$ and thus delivers ac voltage pulses at the input of the transformer 80 (i.e., $v_{tr}$).

When the driver 52 is connected to an electronic ballast, it is in high-frequency operation. $S_T$ 82 is turned on. The switched network 72 is then configured as a phase-shift resonant converter circuit, in which L and C form a low-pass filter. The inductor $L_x$ determines the rated active and reactive power flow between the ballast and driver circuit 52 for given operating conditions, including the switching frequency and dc link voltage $v_{dc}$, in the driver 52. Again, $v_{tr}$ will contain ac voltage pulses.

The operations of the driver circuit 52 in the low-frequency and high-frequency operations are described as follows.

Low-Frequency Operation

With $S_T$ 82 off, the switched network 72 is operated like a bridgeless PFC operating in discontinuous conduction mode (DCM) with fixed switching frequency. Consider the positive half-line cycle of the ac mains power supply. There are three operating modes in one switching cycle. They are shown in FIG. 5. $S_B$ 78 is the main switch and $S_A$ 76 is operated as a synchronous rectifier. The duty cycle of $S_B$ 78 is fixed. The operation in this mode is described as follows.

Since the impedance of $L_x$ is small, the voltage across $L_x$ is small. Thus, $$v_c \cong v_{lamp} \quad (2)$$

Figure 5A:
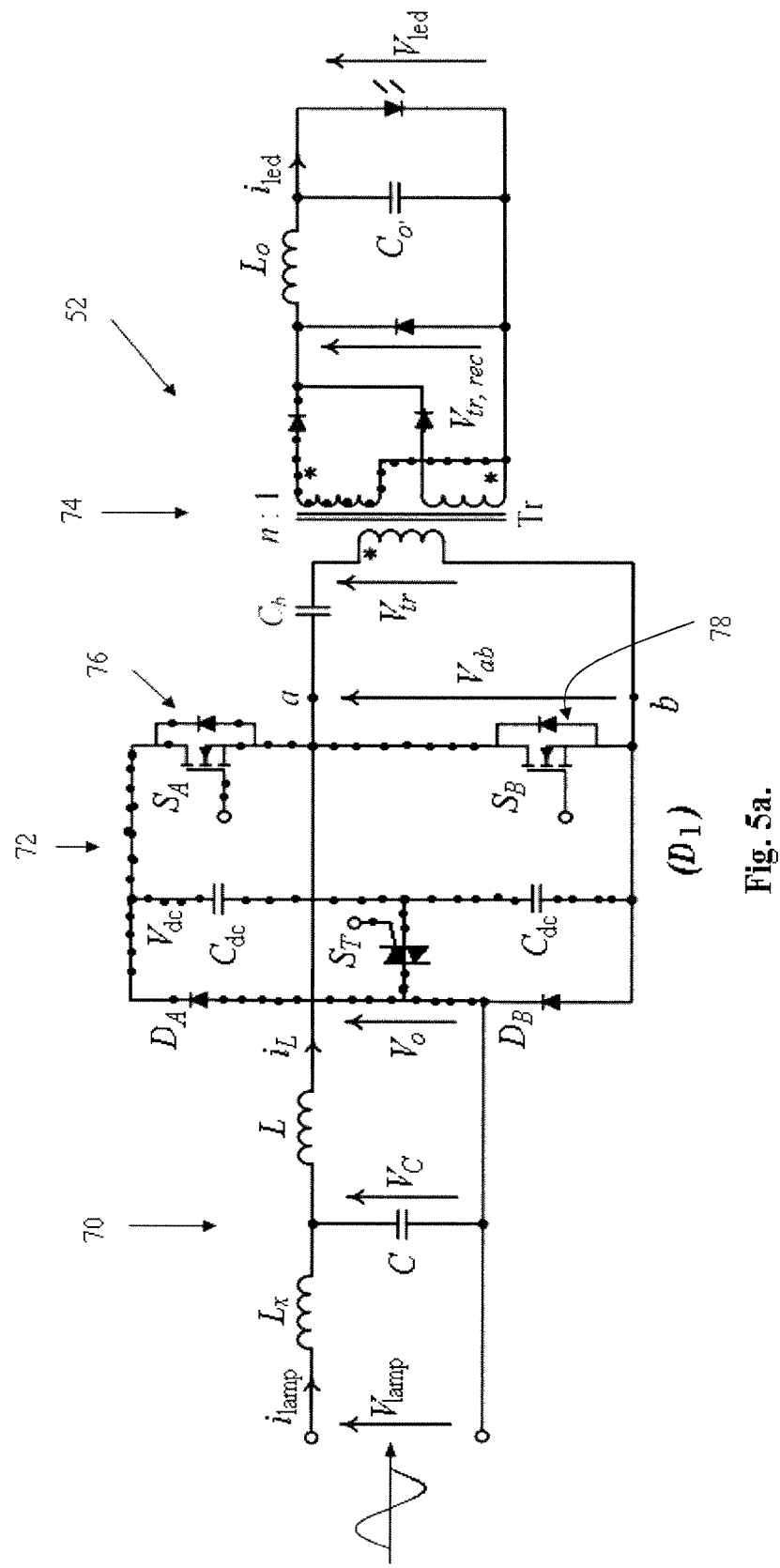
FIG. 5 illustrates low frequency operating modes of the driver circuit of FIG. 4 in the positive half-line cycle where in FIG. 5a $S_A$ is off and $S_B$ is on and $D_B$ conducts, in FIG. 5b $S_A$ is on, $S_B$ is off and $D_B$ conducts, and in FIG. 5c $S_A$ is on, $S_B$ is off and $D_B$ blocks.

As shown in FIG. 5(a) where the dotted lines indicate non-operational parts of the circuit in this mode, when $S_B$ 78 is on, the inductor L is being charged by $v_{lamp}$ through $D_B$. If the duty cycle of $S_B$ 78 is $D_1$, the maximum current through the inductor L, $i_{L,max}$, is $$i_{L,max}(t) = \frac{D_1 T_s \sqrt{2} |v_{lamp}| \sin(\omega_{lamp} t)}{L} \quad (3)$$

and the voltages $v_{ab}$, $v_{tr}$ and the rectified transformer output voltage $V_{tr,rec}$ are $$v_{ab} = 0 \quad (4)$$

$$v_{tr} = -(1-D_1)V_{dc} \quad (5)$$

$$v_{tr,rec} = \frac{1}{n}(1-D_1)V_{dc} \quad (6)$$

where $\omega_{lamp}$ and $|v_{lamp}|$ are the angular frequency and rms voltage of $v_{lamp}$, respectively, $T_s$ is the switching period of the switched network 72, and $V_{dc}$ is the total voltage across the two dc-link capacitors.

Figure 5B:
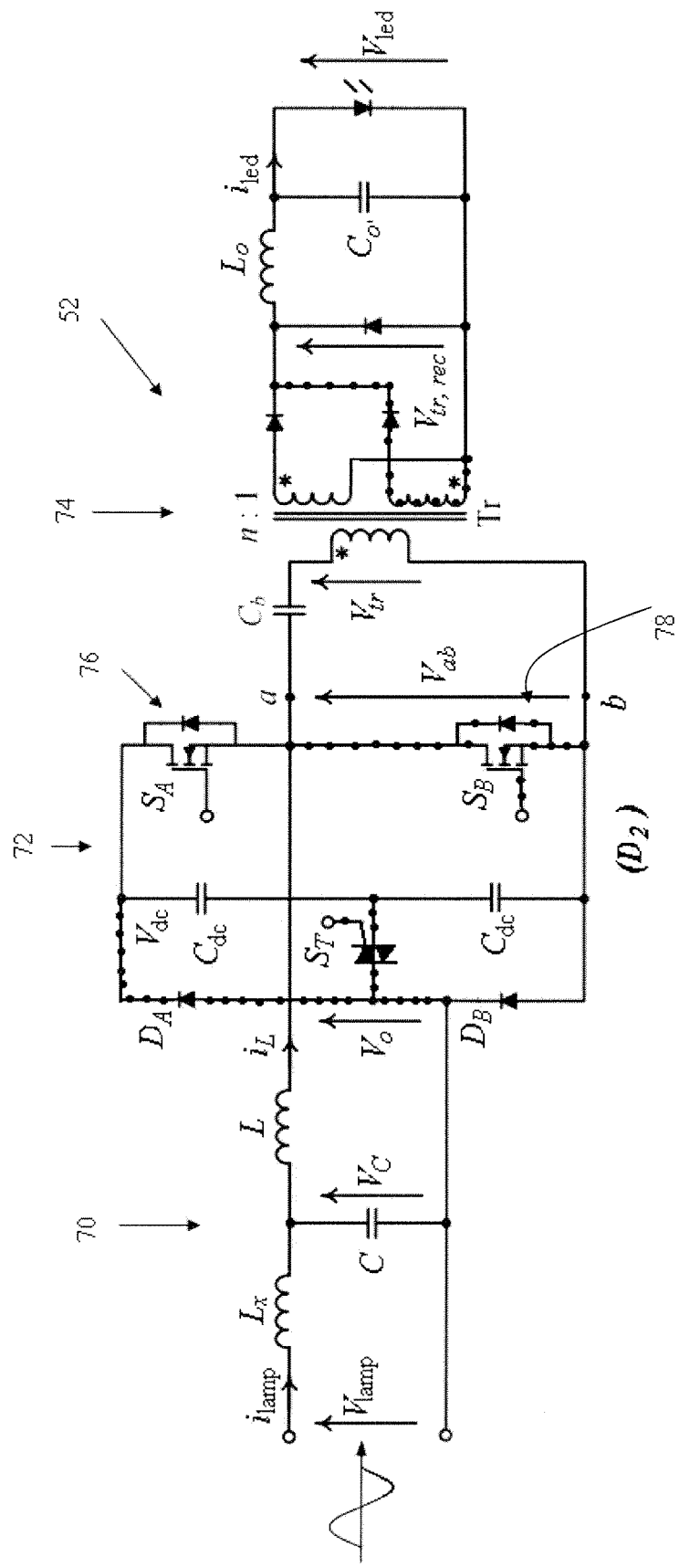

As shown in FIG. 5(b) where the dotted lines indicate non-operational parts of the circuit in this mode, when $S_B$ 78 is turned off and $S_A$ 76 is turned on, the energy stored in L together with $v_{ac}$ will be transferred to the third stage 74. The current through L will go to zero linearly. The duration of this topology $D_2 T_s$ can be expressed as $$D_2(t)T_s = L \frac{i_{L,max}(t)}{V_{dc} - \sqrt{2}|v_{lamp}|\sin(\omega_{lamp} t)} \quad (7)$$

and the voltages $v_{ab}$, $v_{tr}$ and the rectified transformer output voltage $v_{tr,rec}$ are $$v_{ab} = V_{dc} \quad (8)$$

$$v_{tr} = D_1 V_{dc} \quad (9)$$

$$v_{tr,rec} = \frac{1}{n} D_1 V_{dc} \quad (10)$$

It will be shown later in (19) that the average voltage on $C_b$ equals $(1-D_1)V_{dc}$.

Figure 5C:
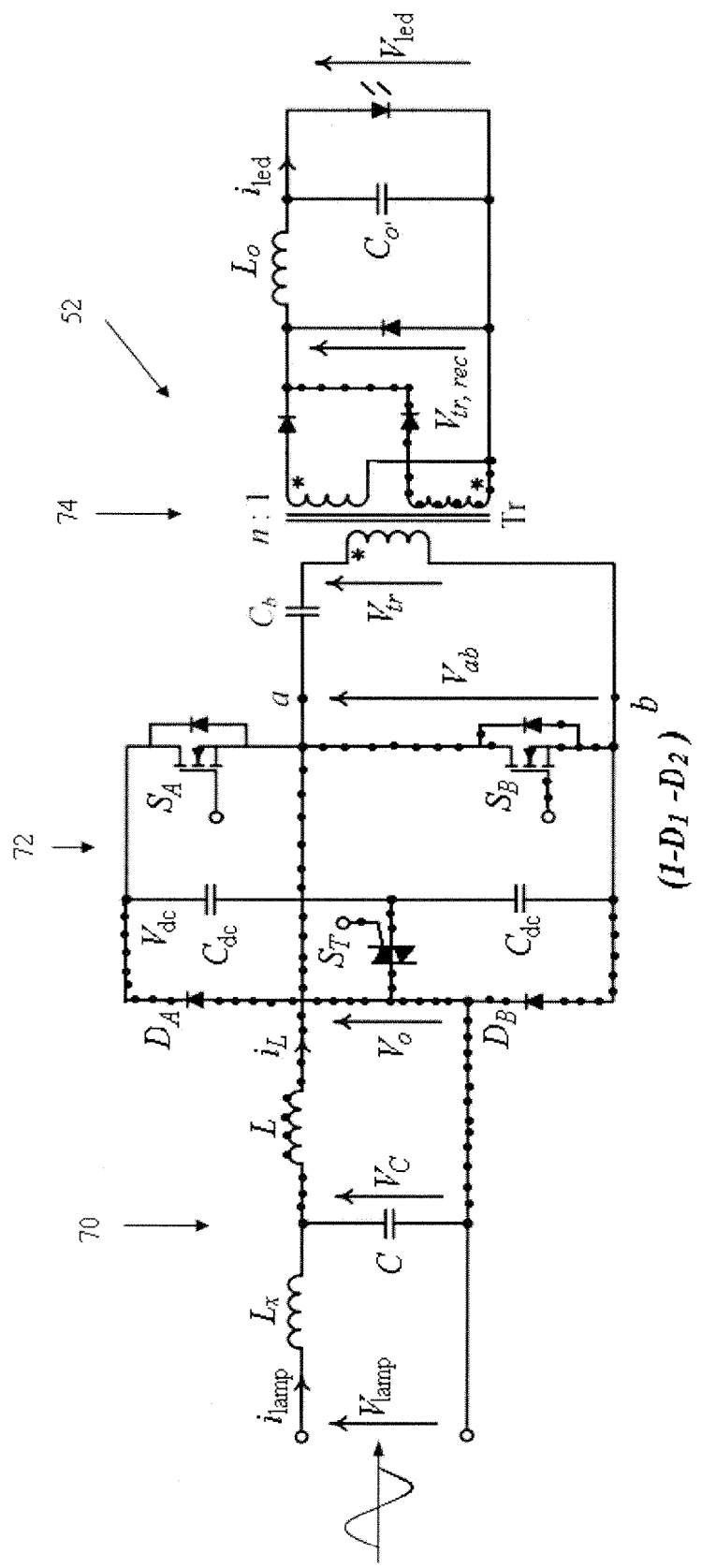

As shown in FIG. 5(c) where the dotted lines indicate non-operational parts of the circuit in this mode, after L has been fully discharged, $$i_L = 0 \quad (11)$$

The third stage 74 of the driver circuit 52 is powered by the dc-link capacitors. Equations (8)-(10) still hold.

The average current of L, $i_{L,avg}$, and input power p in a switching cycle are $$i_{L,avg}(t) = \frac{i_{L,max}(t)}{2}(D_1 + D_2) \quad (12)$$

$$\text{and } p(t) = i_{L,avg}\sqrt{2}|v_{lamp}|\sin(\omega_{lamp} t) \quad (13)$$

Thus, the average input power P is $$P = \frac{\omega_{lamp}}{\pi}\int_0^{\pi/\omega_{lamp}} p(t)dt \quad (14)$$

$$= \frac{\sqrt{2}}{2\pi}\frac{D_1^2 T_s V_{dc}|v_{lamp}|}{L}\int_0^{\pi}\frac{\sin^2\theta}{\left(\frac{V_{dc}}{\sqrt{2}|v_{lamp}|} - \sin\theta\right)}d\theta$$

In the above equation, $$\int_0^\pi \frac{\sin^2\theta}{\left(\frac{V_{dc}}{\sqrt{2}|v_{lamp}|} - \sin\theta\right)}d\theta = \quad (15)$$

$$\frac{K_v^2}{\sqrt{K_v^2-1}}\left(\pi + 2\arctan\frac{1}{\sqrt{K_v^2-1}}\right) - K_v\pi - 2$$

where $$K_v = \frac{V_{dc}}{\sqrt{2}|v_{lamp}|}.$$

Thus, equation (14) can be expressed as $$P = \frac{|v_{lamp}|^2 D_1^2 T_s}{\pi L}\left[\frac{K_v^3}{\sqrt{K_v^2-1}}\left(\pi + 2\tan^{-1}\frac{1}{\sqrt{K_v^2-1}}\right) - K_v^2\pi - 2K_v\right] \quad (16)$$

Thus, based on (16), the equivalent value of $G_i$ in FIG. 3 equals $$G_i = \quad (17)$$

$$\frac{P}{|v_{lamp}|^2} = \frac{D_1^2 T_s}{\pi L}\left[\frac{K_v^3}{\sqrt{K_v^2-1}}\left(\pi + 2\tan^{-1}\frac{1}{\sqrt{K_v^2-1}}\right) - K_v^2\pi - 2K_v\right]$$

The value of $Y_i$ in FIG. 4 is generally chosen to be zero in order to reduce reactive power flow between the ballast and driver.

The value of $D_1$ at different $v_{lamp}$ can be expressed as $$D_1 = \frac{1}{|v_{lamp}|} \sqrt{\frac{\pi L P}{T_s \left[\frac{K_v^3}{K_v^2 - 1}\left(\pi + 2\tan^{-1}\frac{1}{\sqrt{K_v^2 - 1}}\right) - K_v^2 \pi - 2K_v\right]}} \quad (18)$$

In the negative half-line cycle, $S_A$ 76 becomes the main switch and $S_B$ 78 is operated as a synchronous rectifier. The operating principle is similar to that in the positive half-cycle.

$v_{ab}$ consists of high-frequency voltage pulses. Its dc component is blocked by the capacitor $C_b$. Thus, the input voltage of the transformer $v_{tr}$ is purely ac. The average voltage on $C_b$, $V_{Cb}$, is equal to the average value of $v_{ab}$. Thus, $$V_{Cb} = (1 - D_1)V_{dc} \quad (19)$$

By using (6) and (10), the LED voltage $v_{led}$ is equal to $$v_{led} = D_1 \frac{1}{n}(1 - D_1)V_{dc} + (1 - D_1)\frac{1}{n}D_1 V_{dc} \quad (20)$$
$$= \frac{2}{n}D_1(1 - D_1)V_{dc}$$

It should be noted that $D_1 = 0.5$ is preferred, because in this condition the voltage across $C_b$ will be constant in both positive and negative half-line cycles. This can reduce the ripple current through the LED lamp during the transition time between positive and negative half-cycle. However, with $D_1 = 0.25$, the dc voltage on $C_b$, $v_{Cb}$, is changed from the positive to the negative half-line cycle. Thus, waveforms of $v_{tr}$ and thus the voltage $v_{tr,rec}$ at the input of the output filter formed by $L_o$ and $C_o$ will be momentarily distorted.

To ensure the PFC operating in DCM for all possible input voltage, the maximum duty cycle $D_{max}$ allowing for different values of $v_{lamp}$ determined by the boundary condition for the continuous conduction on mode (CCM). That is, by using the steady-state voltage conversion ratio of a boost converter in CCM $$\frac{V_{dc}}{\sqrt{2}|v_{lamp}|} = \frac{1}{1 - D_{max}} \quad (21)$$
$$\Rightarrow D_{max} = 1 - \frac{\sqrt{2}|v_{lamp}|}{V_{dc}}$$

Equation (21) gives the design constraint for determining the values of L and switching frequency.

By putting (18) into (20), the relationship between $V_{dc}$ and $v_{lamp}$ can be expressed as $$1 = \frac{2\sqrt{2} K_v}{n v_{led}} \sqrt{\frac{\pi L P}{T_s \left[\frac{K_v^2}{\sqrt{K_v^2 - 1}}\left(\pi + 2\tan^{-1}\frac{1}{\sqrt{K_v^2 - 1}}\right) - K_v^2 \pi - 2K_v\right]}} \times \quad (22)$$

$$\left(1 - \frac{1}{|v_{lamp}|} \sqrt{\frac{\pi L P}{T_s \left[\frac{K_v^2}{\sqrt{K_v^2 - 1}}\left(\pi + 2\tan^{-1}\frac{1}{\sqrt{K_v^2 - 1}}\right) - K_v^2 \pi - 2K_v\right]}}\right)$$

Based on (21) and (22) and using the parameters given in Table I of the drawings, within the operating range, $v_{lamp}$ varies from 100V to 265V. The dc link voltage varies from 324V to 530V while the duty cycle is smaller than the maximum value $D_{max}$.

High-Frequency Operation.

Figure 6:
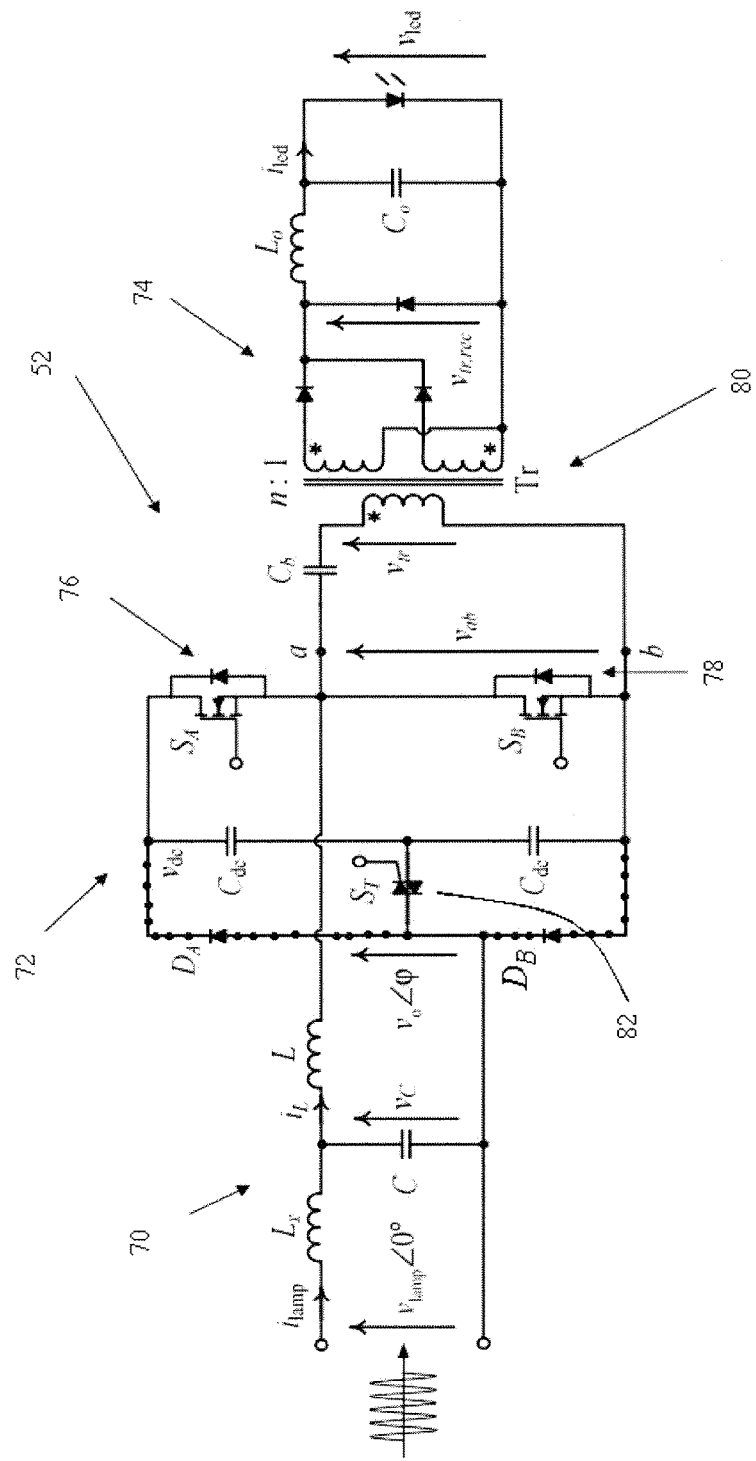
FIG. 6 illustrates a high frequency operating mode of the driver circuit of FIG. 4.

With $S_T$ 82 on, the equivalent circuit of the driver circuit 52 of FIG. 4 is shown in FIG. 6 where the dotted lines indicate non-operational parts of the circuit in this mode.

The gate signals applied to $S_A$ 76 and $S_T$ 78 are synchronized with $v_{lamp}$ with a phase difference of $\phi$. The value of $\phi$ determines the power flow drawn from the ballast to the LED 56.

Consider the models of the electronic ballast in FIGS. 2(b) and (c) and the driver circuit in FIG. 3(b), the impedance $Z_{inv}$ seen by the inverter is $$Z_{inv} = j\omega_{lamp}l_r + \frac{1}{G_i + j(Y_i + \omega_{lamp}C_r)} \quad (23)$$

As the impedances of the filaments are much smaller than the filter and lamp impedances, for the sake of simplicity in the analysis, their values are ignored in the above expression. Thus, the real and imaginary parts of $Z_{inv}$ are $$\text{Re}[Z_{inv}] = \frac{G_i}{G_i^2 + (Y_i + \omega_{lamp}C_r)^2} \quad (24)$$

and $$\text{Im}[Z_{inv}] = \omega L_r - \frac{Y_i + \omega_{lamp}C_r}{G_i^2 + (Y_i + \omega_{lamp}C_r)^2} \quad (25)$$

To ensure soft-switching of the switches in the ballast, $Z_{inv}$ has to be inductive, that is, $\text{Im}[Z_{inv}] > 0$. Thus, based on (25), $$\omega_{lamp}L_r > \frac{Y_i + \omega_{lamp}C_r}{G_i^2 + (Y_i + \omega_{lmap}C_r)^2} G_i^2 + \left(Y_i + \omega_{lamp}C_r - \frac{1}{2\omega_{lamp}L_r}\right)^2 > \quad (26)$$
$$\left(\frac{1}{2\omega_{lamp}L_r}\right)^2$$

Equation (25) gives a circular locus on the $G_i$-$Y_i$ plane. As shown in FIG. 7, $S_1$ and $S_2$ are soft-switched if the combinations of the values of $G_i$ and $Y_i$ are outside the shaded region for ballasts with and without current feedback.

Figure 8A:
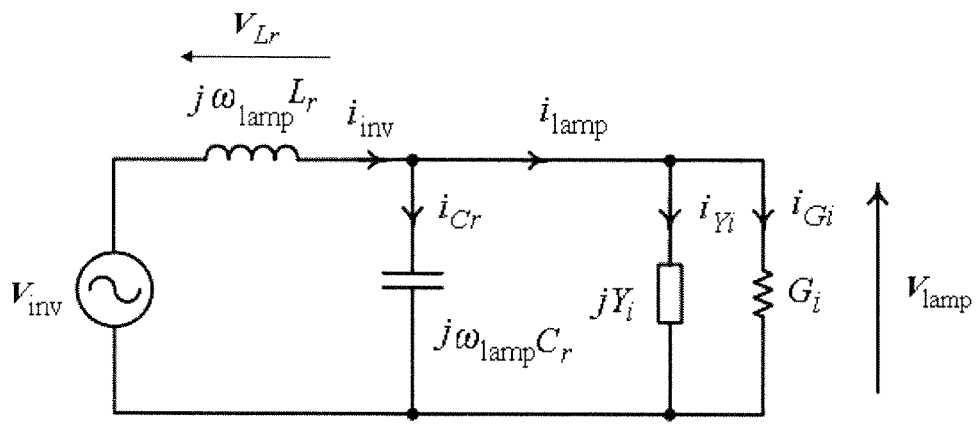
FIG. 8a is an equivalent circuit of the system of FIG. 3a without current feedback.
Figure 8A:
Figure 8A:
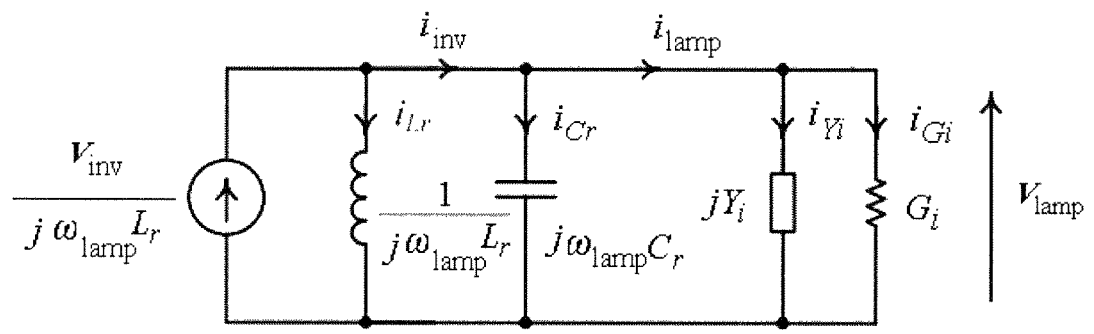

FIGS. 8(a) and (b) show the equivalent circuits of the system in FIG. 2 for electronic ballasts without and with current feedback, respectively. Consider the circuit given in FIG. 8(a), $$|v_{lamp}|^2 = \left(\frac{|v_{inv}|}{\omega_{lamp}L_r}\right)^2 \frac{1}{G_i^2 + \left(Y_i + \omega_{lamp}C_r - \frac{1}{\omega_{lamp}L_r}\right)^2} \Rightarrow \quad (27)$$

$$G_i^2 + \left(Y_i + \omega_{lamp}C_r - \frac{1}{\omega_{lamp}L_r}\right)^2 = \left(\frac{|v_{inv}|}{\omega_{lamp}L_r |v_{lamp}|}\right)^2$$

Figure 7A:
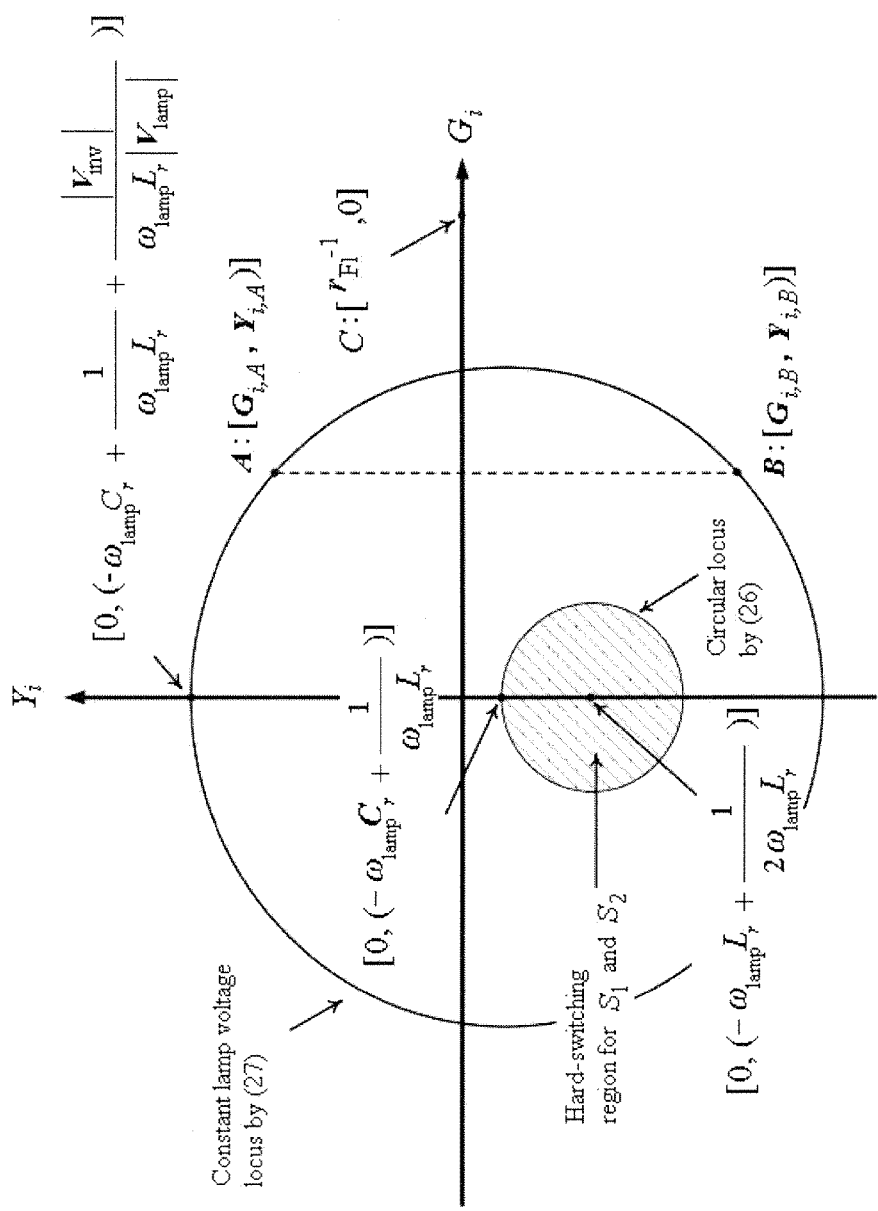
FIG. 7a is a graph illustrating the operating points of the driver circuit of FIG. 4 in the $G_i$-$Y_i$ plane without current feedback.

Thus, as illustrated in FIG. 7(a), the circle described by (27) gives a constant lamp voltage locus on the $G_i$-$Y_i$ plane for ballasts without current feedback.

Figure 8B:
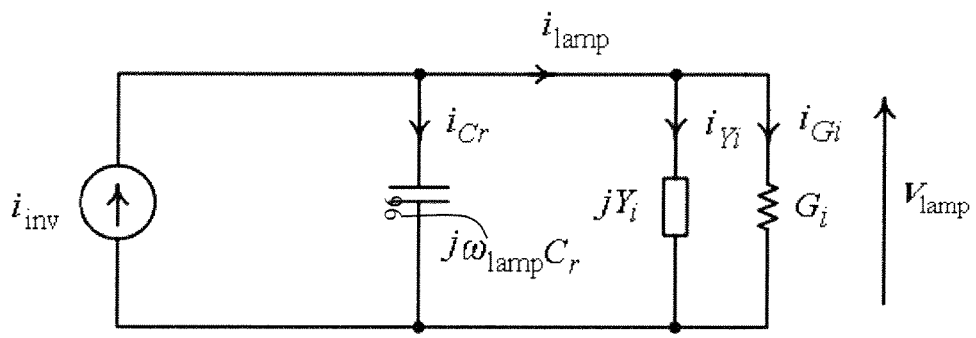
FIG. 8b is an equivalent circuit of the system of FIG. 3a with current feedback.

Consider the circuit given in FIG. 8(b), $$|v_{lamp}|^2 = \quad (28)$$

$$|i_{inv}|^2 \frac{1}{G_i^2 + (Y_i + \omega_{lamp}C_r)^2} \Rightarrow G_i^2 + (Y_i + \omega_{lamp}C_r)^2 = \left(\frac{|i_{inv}|}{|v_{lamp}|}\right)^2$$

Figure 7B:
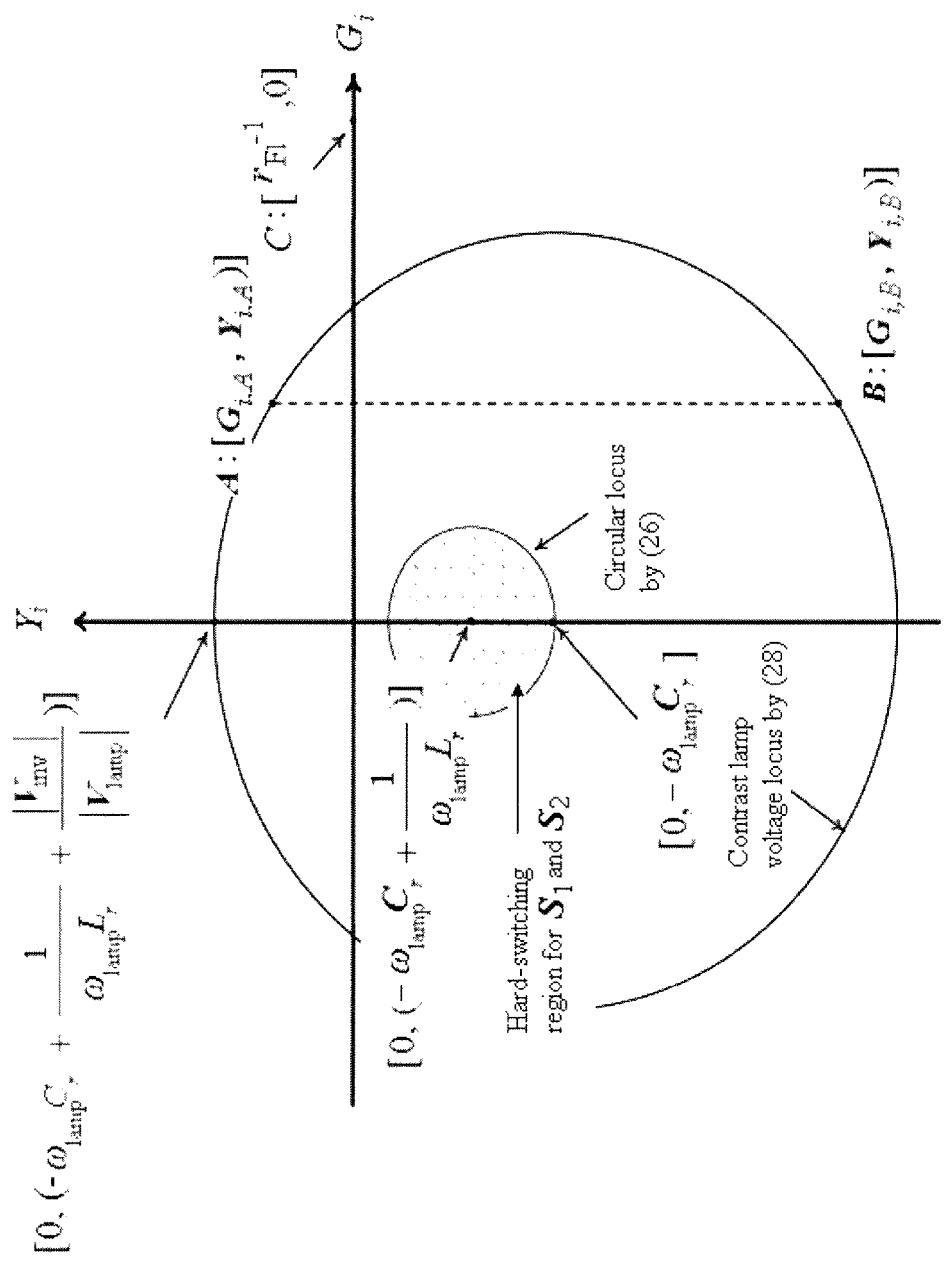
FIG. 7b is a graph illustrating the operating points of the driver circuit of FIG. 4 in the $G_i$-$Y_i$ plane with current feedback.

Again, as shown in FIG. 7(b), the circle described by equation (28) gives a constant lamp voltage locus on the $G_i$-$Y_i$ plane for ballasts with current feedback.

The active power P and reactive power Q handled by the driver are $$P = |v_{lamp}|^2 G_i \quad (29)$$

and $$Q = |v_{lamp}|^2 Y_i \quad (30)$$

As shown in FIG. 7, with the same value of $|v_{lamp}|$, there are two possible values of $Y_i$ that will give the same lamp value of $G_i$ (i.e., same lamp power). For example, in FIG. 7(a) and FIG. 7(b), points 'A' and '13' have the same value of $G_i$ (i.e., $G_{i,A} = G_{i,B}$). According to (29), they give the same lamp power. The value of $Y_i$ at point 'A' (i.e., $Y_{i,A}$) is positive while the one at point 'B' (i.e., $Y_{i,B}$) is negative. Thus, the input of the driver is capacitive at point 'A' and is inductive at point 'B'.

For the ballast without current feedback, it can be derived from (27) and (29) that the values of $Y_{i,A}$ and $Y_{i,B}$ in FIG. 7(a) are $$Y_{i,A} = \frac{\sqrt{\left[\frac{|v_{inv}|}{\omega_{lamp}L_r}\right]^2 - \left[\frac{P}{|v_{lamp}|}\right]^2} - \left[\omega_{lamp}C_r - \frac{1}{\omega_{lamp}L_r}\right]|v_{lamp}|}{|v_{lamp}|} \quad (31)$$

$$Y_{i,B} = \frac{-\sqrt{\left[\frac{|v_{inv}|}{\omega_{lamp}L_r}\right]^2 - \left[\frac{P}{|v_{lamp}|}\right]^2} - \left[\omega_{lamp}C_r - \frac{1}{\omega_{lamp}L_r}\right]|v_{lamp}|}{|v_{lamp}|} \quad (32)$$

For the ballast with current feedback, it can be derived from (28) and (29) that the values of $Y_{i,A}$ and $Y_{i,B}$ in FIG. 7(b) are $$Y_{i,A} = \frac{\sqrt{|i_{inv}|^2 - \left[\frac{P}{|v_{lamp}|}\right]^2} - \omega_{lamp}C_r|v_{lamp}|}{|v_{lamp}|} \quad (33)$$

$$Y_{i,B} = \frac{-\sqrt{|i_{inv}|^2 - \left[\frac{P}{|v_{lamp}|}\right]^2} - \omega_{lamp}C_r|v_{lamp}|}{|v_{lamp}|} \quad (34)$$

It is noted that point 'C' in FIG. 7 represents the condition at which the input of the LED lamp 56 is purely resistive, as $Y_i = 0$. It is equivalent to the operating conditions of the fluorescent lamp 10. The operating point 'A' of the LED lamp 56 gives the same lamp voltage as in the situation with the fluorescent lamp 10, but with lower lamp power.

The reactive power Q handled by the driver 52 is $$Q = |v_{lamp}|\left[\tau\sqrt{|i_{inv}|^2 - \left(\frac{P_{LED}}{|v_{lamp}|}\right)^2} - \omega_{lamp}C_r|v_{lamp}|\right] \quad (35)$$

where the input of the driver 52 is capacitive for $\tau = 1$ and is inductive for $\tau = -1$.

It is more favorable to operate the driver circuit 52 in inductive mode.

For the circuit shown in FIG. 6, let $Z_A = j\omega_{lamp}L_x$, $Z_B = 1/(j\omega_{lamp}C)$, and $Z_C = j\omega_{lamp}L$, the input current $i_{lamp}$ is $$i_{lamp} = \frac{v_{lamp} - v_C}{Z_A} = j(K_1 v_{lamp} - K_2 v_o) \quad (36)$$

where $$K_1 = -\frac{1 - \omega_{lamp}^2 LC}{\omega_{lamp}L + \omega_{lamp}L_x(1 - \omega_{lamp}^2 LC)}$$

and $$K_2 = -\frac{1}{\omega_{lamp}L + \omega_{lamp}L_x(1 - \omega_{lamp}^2 LC)}$$

The polar and rectangular forms of $v_o$ are expressed as follows $$v_o = |v_o|e^{j\varphi} \quad (37)$$
$$= |v_o|\cos\varphi + j|v_o|\sin\varphi$$

where $|v_o|$ is the magnitude of $v_o$.

The active power P and reactive power Q transferring from the ballast to the driver 52 are calculated by using (36) and (37). Thus, $$P = \text{Re}[v_{lamp} i_{lamp}^*] \quad (38)$$
$$= K_2 |v_{lamp}||v_o|\sin\varphi$$

and $$Q = \text{Im}[v_{lamp} i_{lamp}^*] \quad (39)$$
$$= -K_1 |v_{lamp}|^2 + K_2 |v_{lamp}||v_o|\cos\varphi$$

where Re[•] and Im[•] are the real and imaginary parts of the function, respectively, and $i_{lamp}^*$ is the conjugate of $i_{lamp}$.

By using (20) with D=0.5, $$v_{led} = \frac{1}{2n} V_{dc} \qquad (40)$$

In designing the driver circuit 52 of the invention, the values of $L_x$, C, L, n, are designed by applying the following steps by using the following parameters.

$P_{LED}$: Active power handled by the driver 52;
$P_{rated,EB}$: Rated power of the electronic ballast 30;
$V_{lamp,EB}$: Lamp voltage with electronic ballast;
$V_{ac,min}$: Minimum input voltage of the driver 52 in low-frequency operation;
$V_{ac,max}$: Maximum input voltage of the driver 52 in low-frequency operation;
$f_{EB}$: Operating frequency of the electronic ballast 30.

Step 1—By considering the low-frequency operation, the steady-state duty cycle is chosen to be 0.5 when $V_{ac}=V_{ac,min}$. By using (21), the dc-link voltage $v_{dc}$ with the input of $V_{ac,min}$, $V_{dc,min}$, is equal to $$v_{dc,min} = 2\sqrt{2}\, V_{ac,min} \qquad (41)$$

As the duty cycle is also 0.5 in high-frequency operation, the dc-link voltage equals $v_{dc,min}$. By using (20), the turns ratio of the transformer is chosen as $$n = \frac{\sqrt{2}\, V_{ac,min}}{v_{led}} \qquad (42)$$

Step 2—The cutoff frequency of $L_x$ and C should be chosen to be slightly lower than $f_{EB}$ so as to reduce the harmonics in the input current generated by the driver. Thus, the switching frequency $f_{low}$ of $S_A$ 76 and $S_B$ 78 in low-frequency operation is about two times of $f_{EB}$. Thus, by using (16) and (41), $$K_v = \frac{V_{dc}}{\sqrt{2}\,|v_{lamp}|} = \frac{V_{dc,min}}{\sqrt{2}\, V_{ac,min}} = 2,$$

the value of L is $$L = \frac{V_{ac,min}^2}{4\pi P_{LED} f_{low}} \left[ \frac{K_v^3}{\sqrt{K_v^2-1}} \left(\pi + 2\tan^{-1}\frac{1}{\sqrt{K_v^2-1}}\right) - K_v^2 \pi - 2K_v \right] \qquad (43)$$

$$= \frac{2.78 V_{ac,min}^2}{4\pi P_{LED} f_{low}}$$

Step 3—The cutoff frequency of L and C should be chosen to be lower than $f_{EB}$. Thus, $$C > \frac{1}{L}\left(\frac{1}{2\pi f_{EB}}\right)^2 \qquad (44)$$

A practical value for C is chosen.

Step 4—In high-frequency operation, the driver 52 will draw the same volt-amp as the electronic ballast 30. Thus, the reactive power handled by the driver, $Q_{LED}$, is approximated by considering the rated power of the electronic ballast and rated LED power. That is, $$Q_{LED} \cong \sqrt{P_{rated,EB}^2 - P_{LED}^2} \qquad (45)$$

By using (36)-(38) and eliminating cp, the value of $L_x$ is determined. It can be shown that $$P_{reated,EB}^2 x^2 - 2Q_{LED}(1-\omega_{EB}^2 LC)V_{Lamp,EB}^2 x + \qquad (46)$$
$$(1-\omega_{EB}^2 LC)^2 V_{Lamp,EB}^4 - V_{Lamp,EB}^2 \left|\frac{2v_{dc,min}}{\pi}\right|^2 = 0$$

and $$L_x = \frac{x - \omega_{EB} L}{\omega_{EB}(1-\omega_{EB}^2 LC)} \qquad (47)$$

Thus, the value of $L_x$ can be solved by eliminating x in (46) and (47) with an iterative method.

In this step, a positive value of $Q_{LED}$ is chosen because the calculated value of $L_x$ has to satisfy the requirement of having the cutoff frequency of the filter formed by $L_x$ and C being lower than one half of the switching frequency of PFC. Thus, the operating points will be at point 'B' in FIG. 7. That is, $$\frac{1}{2\pi\sqrt{L_x C}} < f_{low} \qquad (48)$$

Figure 9:
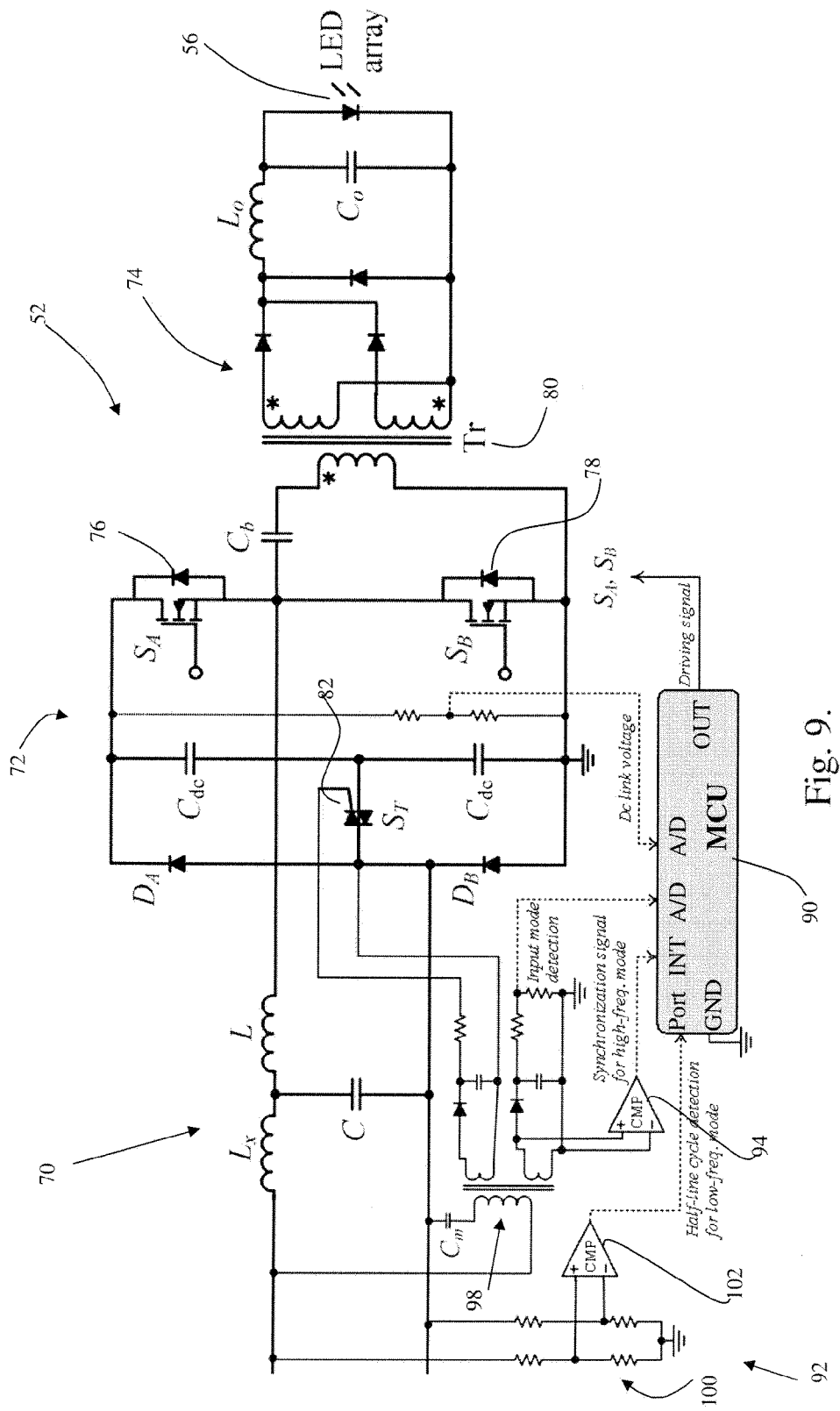
FIG. 9 is a circuit diagram of an LED lamp prototype incorporating a driver circuit according to the invention.
Figure 10:
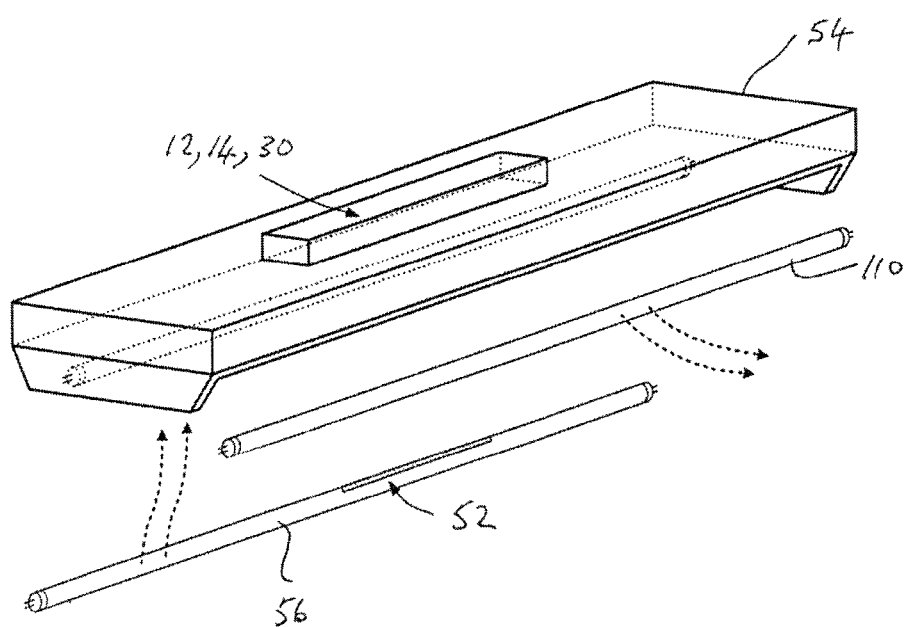
FIG. 10 is a perspective view of an LED lamp system incorporating a driver circuit according to the invention.

To verify the operation of the driver circuit 52 of the invention, a prototype of an LED lamp system was constructed to include a driver circuit 52. The schematic circuit of the prototype is shown in FIG. 9 and a physical implementation is shown in FIG. 10. It can be seen in FIG. 9 that the prototype includes a microcontroller 90 which in this particular instance comprises a STC12C5410AD microcontroller. In addition, first and second comparator circuits 92, 94 are added to enable the microcontroller 90 to detect the mode of operation of the driver circuit 52. The operating mode of the driver 52, either in low-frequency or high-frequency operation, is detected by a circuit formed by the capacitor $C_m$ 96 and a transformer 98. As the impedance of $C_m$ 96 is low in high-frequency operation, the input mode detection signal will be "high" applied to the microcontroller 90, and vice versa. A synchronization signal derived from the transformer 98 will be sent to an interrupt pin (i.e., INT) of the microcontroller 90 to generate the gate signal to $S_A$ 76 and $S_B$ 78. In low-frequency operation, the synchronization signal is derived from a resistive network 100 and a first comparator CMP 102 comprising the first comparator circuit 92. The dc link voltage is also sensed by the controller 90 to regulate the dc-link voltage. In high-frequency operation, the synchronization signal is derived from the transformer 98 and a second comparator CMP 104 comprising the second comparator circuit 94.

Table I shows the design specifications of the lamp system of FIGS. 9 and 10. The lamp is evaluated by connecting it to the ac mains power supply, output of an electromagnetic ballast (model no.: MIL 1x36W) and a non-dimmable electronic ballast (model no.: OSRAM QTP 2x36/230-240). The ballasts are used to drive 36W fluorescent lamps. The electronic ballast is used to drive two lamps.

Table II of the drawings shows the values of the components used in the prototype. A separate winding on the transformer is added for supplying power to the controller 90, gate driver and electronic components.

For a conventional fluorescent lamp at startup with the electromagnetic ballast, the peak ignition voltage is 600V. The input power of the whole system is 36.4 W, power factor is 0.503 and the THD of the input current is 12.1%.

For the conventional fluorescent lamp at startup with the electronic ballast, the peak ignition voltage is 500V and the input power of the whole system is 69.0 W, power factor is 0.978 and the THD of the input current is 6.0%.

In contrast, for the prototype lamp system of FIGS. 9 and 10 at startup with the electromagnetic ballast, the peak voltage applied to the driver 52 is 300V. The input power of the whole system is 29.4 W, power factor is 0.931 and the THD of the input current is 6.6%.

For the prototype lamp system of FIGS. 9 and 10 at startup with the electronic ballast, the peak voltage is 150V. The input power of the whole system is 63.0 W, power factor is 0.968 and the THD of the input current is 7.4%.

For the prototype lamp system of FIGS. 9 and 10 with the lamp connected to the ac mains 110V, 60 Hz, the input power is 25.5 W, input power factor is 0.997 and the THD of the input current is 6.4%.

For the prototype lamp system of FIGS. 9 and 10 with the lamp connected to the ac mains 220V, 50 Hz, the input power is 26.7 W, input power factor is 0.982 and the THD of the input current is 16.8%. Furthermore, for the current through the LED array, the peak-to-peak current ripple is found to be less than 30%, which is acceptable in industrial application. The ripple can be further reduced at the expense of increasing the value of the output capacitor $C_o$.

It can be more clearly seen from the physical implementation of the system illustrated by FIG. 10 that the present invention provides in one of its aspects an LED lamp including a driver circuit. FIG. 10 shows an existing lamp fitting 54 for a non-dc lamp such as a fluorescent tube 110 which is illustrated as being in the process of being removed. Also present is an LED lamp 56 according to the invention including a driver circuit 52 in the process of being installed into the existing lamp fitting 54. The LED lamp 56 incorporating the driver circuit 52 of the invention can be electrically connected into the lamp fitting 54 whereby said driver circuit 52 enables said LED lamp 56 to be powered by said lamp fitting 54 without modification of the lamp fitting 54. The driver circuit 52 connects to the existing lamp fitting 54 such that it electrically connects to any of an electromagnetic ballast 14, an electronic ballast 30 and/or an ac power supply 12 of the lamp fitting 54. However, in another of its aspects, the invention provides a lamp fitting configured to power a non-LED lamp, where the lamp fitting has associated with it a driver circuit according to the invention, said driver circuit adapted to receive a LED lamp whereby the driver circuit enables the LED lamp to be powered by the lamp fitting. In this case, the driver circuit module is designed to connect to electrical contacts of the existing lamp fitting to be retained therein. The driver circuit module has means for then enabling it to receive a standard LED lamp or lamp array whereby the driver circuit acts as an interconnect between the LED lamp and the existing lamp fitting.

The invention also provides a method of powering a LED lamp in a lamp fitting designed for a non-LED lamp type where said method comprises connecting a driver circuit according to the invention between the LED lamp and the electrical connections of the existing lamp fitting.

A universal driver for retrofit LED lamp has been described. It is compatible with conventional low-frequency electromagnetic ballasts, high-frequency electronic ballasts and ac mains power supplies. It provides an eco-friendly and simple solution for LED replacements for fluorescent lamps without requiring the replacing of any electronic ballast circuitry or modifying the existing lighting infrastructure.

In general, the invention provides a driver circuit for adapting an LED lamp or an LED lamp array to be used in a lamp fitting for a non-LED type lamp without modification of the lamp fitting. The driver circuit is such that the LED lamp or LED lamp array can be inserted into the lamp fitting as a replacement for a non-LED lamp such that the LED lamp and the driver circuit are retained in the lamp fitting and make electrical connections with the lamp fitting's electrical contacts for powering the inserted lamp. The driver circuit enables the LED lamp or lamp array to operate with any of an ac power supply, an electromagnetic ballast or an electronic ballast of the lamp fitting. The driver circuit comprises a first stage comprising a filter circuit and having an input connectable to any of an ac power supply, an electromagnetic ballast or an electronic ballast of the lamp fitting, a second stage comprising a high frequency switched network and having an input connected to an output of the first stage, and a third stage comprising an ac/dc converter and having an input connected to an output of the second stage and an output connectable to an LED lamp or LED lamp array. The third stage is configured to deliver dc power to a connected LED lamp/array. The second stage is configured to operate in a low frequency mode when said driver circuit is connected to an ac power supply or an electromagnetic ballast of the lamp fitting and configured to operate in a high frequency mode when said driver circuit is connected to an electronic ballast of the lamp fitting. The invention also relates to an LED lamp combined with a driver circuit according to the invention as a replacement lamp unit for a non-LED lamp in the lamp fitting and, in another arrangement, to a lamp fitting configured to power a non-LED lamp, but incorporating a driver circuit according to the invention to thereby adapt said lamp fitting to receive an LED lamp or LED lamp array instead of or in replacement of a lamp of the type for which the fitting was originally configured to power.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

TABLE I

| Low-frequency mode | | | | High-frequency mode | |
| --- | --- | --- | --- | --- | --- |
| (220 V) | | (110 V) | | Electronic Ballast | |
| $f_{ac}$ | 50 Hz | $f_{ac}$ | 60 Hz | $f_{EB}$ | 48.5 kHz |
| $f_{low}$ | 80 kHz | $f_{low}$ | 80 kHz | $v_{lamp,EB}$ | 100 V |
| $v_{ac}$ | 220 V | $v_{ac}$ | 110 V | $P_{LED}$ | 20 W |
| $P_{LED}$ | 20 W | $P_{LED}$ | 20 W | $Q_{LED}$ | 28 VAr |
| $D_1$ | 0.23 | $D_1$ | 0.5 | duty cycle | 0.5 |
| $v_{dc}$ | 460 V | $v_{dc}$ | 325 V | $v_{dc}$ | 325 V |

TABLE II

| Parameter | Value | Parameter | Value |
| --- | --- | --- | --- |
| $L_x$ | 1.3 mH | n | 6 |
| L | 1.55 mH | $L_o$ | 300 µH |
| C | 22 nF | $C_o$ | 10 µF |
| $C_{dc}$ | 10 µf | $v_{led}$ | 27 V |

The invention claimed is:

1. A driver circuit for adapting a dc lamp to operate with any of an ac power supply, an electromagnetic ballast or an electronic ballast, comprising:
   a first stage comprising a filter circuit and having an input connectable to any of an ac power supply, an electromagnetic ballast or an electronic ballast;
   a second stage comprising a high frequency switched network and having an input connected to an output of the first stage; and
   a third stage comprising an ac/dc converter and having an input connected to an output of the second stage and an output connectable to a dc lamp, said third stage being configured to deliver dc power to a connected dc lamp;
   wherein said second stage is configured to operate in a low frequency mode when said driver circuit is connected to an ac power supply or an electromagnetic ballast and configured to operate in a high frequency mode when said driver circuit is connected to an electronic ballast.

2. The driver circuit of claim 1, wherein said driver circuit is configured to adapt a LED lamp to operate with any of an ac power supply, an electromagnetic ballast or an electronic ballast of a non-LED type lamp fitting.

3. The driver circuit of claim 1, wherein said filter circuit of said first stage comprises a low pass filter.

4. The driver circuit of claim 1, wherein said third stage includes a transformer for isolating the dc output of said third stage from the ac input of said third stage.

5. The driver circuit of claim 1, wherein said second stage is configured to operate as a power factor correction circuit when in its low frequency made of operation and the filter circuit operates as a low pass filter to reduce or eliminate high-frequency harmonics generated by the second stage operating as a power factor correction circuit.

6. The driver circuit of claim 5, wherein said second stage is configured to operate as a bridgeless power factor correction circuit in discontinuous conduction mode when in its low frequency made of operation.

7. The driver circuit of claim 6, wherein said power factor correction circuit is operated in its discontinuous conduction mode with a fixed switching frequency.

8. The driver circuit of claim 5, wherein switching transistors of said second stage are operated at a duty cycle between 0.23 and 0.5.

9. The driver circuit of claim 5, wherein switching transistors of said second stage are operated at a duty cycle equal to 0.5.

10. The diver circuit of claim 5, wherein second stage is configured to operate as a phase-shift resonant converter circuit when in its high frequency made of operation.

11. The driver circuit of claim 10, wherein switching transistors of said second stage are operated at a duty cycle equal to 0.5.

12. The driver circuit of claim 1, wherein said second stage is controlled to operate in its low frequency mode or its high frequency mode dependent on a switched state of a bilateral triode thyristor (Triac), said Triac comprising part of said second stage.

13. The driver circuit of claim 1, wherein switching transistors of the second stage are shared with the third stage of the driver circuit.

14. The driver circuit of claim 1, wherein said driver circuit includes a microprocessor controller for detecting an operating mode of the second stage and for deriving a synchronization signal based on a detected operating mode, wherein said microprocessor controller generates a gate signal for switching transistors of the second stage based on said derived synchronization signal.

15. A dc lamp including a driver circuit according to claim 1, wherein said dc lamp can be electrically connected into a lamp fitting for a non-dc type lamp whereby said driver circuit enables said dc lamp to be powered by said lamp fitting without modification of the lamp fitting.

16. The dc lamp of claim 15, wherein said dc lamp is an LED lamp.

17. A lamp fitting configured to power a non-dc lamp, but incorporating a driver circuit according to claim 1 and adapted to receive a dc lamp without modification of the lamp fitting whereby the driver circuit enables the dc lamp to be powered by the lamp fitting.

18. The lamp fitting of claim 17, wherein said dc lamp is an LED lamp.

19. A method of powering a dc lamp in a lamp fitting designed for a non-dc lamp type, said method comprising:
   connecting a driver circuit according to claim 1 between the dc lamp and the electrical connections of the lamp fitting.

20. The method of claim 19, wherein said dc lamp is an LED lamp and said non-dc lamp fitting is a non-LED lamp fitting.

21. The method of claim 20, wherein said method comprises connecting the driver circuit to the LED lamp to form a combined driver circuit and LED lamp unit such the combined driver circuit and LED lamp unit is insertable into the lamp fitting for a non-LED lamp type to be retained in said lamp fitting and make connection with electrical lamp contacts of said lamp fitting.

* * * * *